(12) United States Patent
Gest et al.

(10) Patent No.: US 6,547,507 B1
(45) Date of Patent: Apr. 15, 2003

(54) SCOOTER LIFT FOR MINIVAN

(75) Inventors: William E. Gest, Fountain Hills, AZ (US); Douglas M. Eaton, Phoenix, AZ (US)

(73) Assignee: Vantage Mobility International, LLC, Phoenix, AZ (US)

( * ) Notice: Subject to any disclaimer, the term of this patent is extended or adjusted under 35 U.S.C. 154(b) by 0 days.

(21) Appl. No.: 09/879,505

(22) Filed: Jun. 12, 2001

(51) Int. Cl.[7] .............................. B66C 23/36; B60P 1/54
(52) U.S. Cl. ........................................ 414/543; 212/180
(58) Field of Search ............................ 414/543; 212/180

(56) References Cited

U.S. PATENT DOCUMENTS

| | | | | |
|---|---|---|---|---|
| 2,131,133 A | * | 9/1938 | Babson ........................ | 414/453 |
| 2,862,628 A | * | 12/1958 | Coates et al. ................ | 212/180 |
| 5,011,361 A | | 4/1991 | Peterson ...................... | 414/462 |
| 5,205,700 A | | 4/1993 | Lin et al. ..................... | 414/450 |
| 5,445,487 A | * | 8/1995 | Koscinski, Jr. .............. | 414/453 |
| 5,567,107 A | | 10/1996 | Bruno et al. ................. | 414/462 |
| 5,749,697 A | * | 5/1998 | Davis ........................... | 414/680 |
| 5,810,547 A | | 9/1998 | Bruno et al. ................. | 414/543 |
| 5,853,282 A | | 12/1998 | Bechler et al. .............. | 414/543 |
| 6,082,561 A | * | 7/2000 | Bembas ........................ | 212/180 |
| 6,095,349 A | * | 8/2000 | O'Mera ........................ | 212/180 |

FOREIGN PATENT DOCUMENTS

| | | | | |
|---|---|---|---|---|
| AU | 207606 | * | 10/1955 | ................. 414/453 |
| DE | 1229263 | * | 11/1966 | ................. 414/543 |
| FR | 2580563 | * | 10/1986 | ................. 414/453 |
| GB | 1160214 | * | 8/1969 | ................. 414/543 |
| GB | 1178365 | * | 1/1970 | ................. 414/543 |
| GB | 2248597 | * | 4/1992 | |
| RU | 1486379 | * | 6/1989 | ................. 414/543 |

* cited by examiner

*Primary Examiner*—Steven A. Bratlie
(74) *Attorney, Agent, or Firm*—Paul F. Wille

(57) ABSTRACT

A scooter lift includes a post and boom made from a single piece of curved pipe. The boom further includes an arm that is rotationally adjustable about the pipe to provide small, incremental changes in elevation. Incremental rotational adjustment is achieved by a plate attached to the pipe and having a first set of holes that align with second set holes in the angular portion. The holes are drilled in a pattern that provides a vernier-like adjustment of position. The post is mounted on a base such that at least some of the post overlies a point outside the footprint of the base.

20 Claims, 4 Drawing Sheets

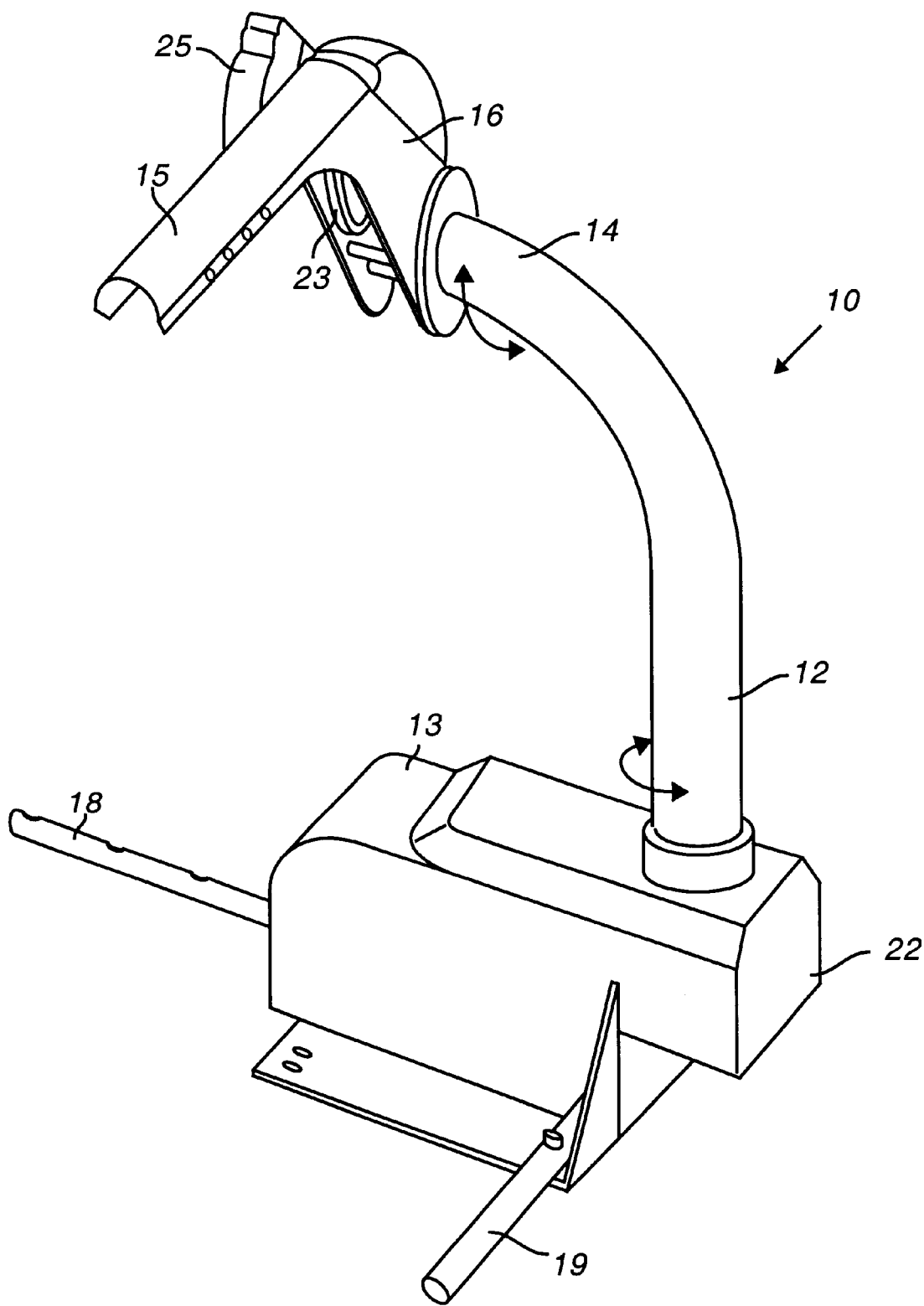
F I G. 2

SCOOTER LIFT FOR MINIVAN

BACKGROUND OF THE INVENTION

This invention relates to a scooter lift for a minivan and, in particular, to an improved internal lift for loading a scooter into a minivan and unloading a scooter from a minivan.

A variety of small motorized scooters have been developed to carry a seated person through areas intended for pedestrian traffic. These scooters are battery powered, ride on either three or four small wheels, and are relatively compact but can be rather heavy because of the battery and electric motor. Unlike powered or unpowered wheelchairs, motorized scooters are usually not driven into a van or other vehicle with a person seated on the scooter. Rather, a lift is provided for attaching a scooter to the van for traveling long distances. Such lifts are either external, as illustrated in U.S. Pat. No. 5,011,361 (Peterson) and U.S. Pat. No. 5,567,107 (Bruno), or internal, as illustrated in U.S. Pat. No. 5,205,700 (Lin et al.) and U.S. Pat. No. 5,853,282 (Bechler et al.). External lifts typically have a fold-down platform for receiving the scooter. An internal lift is essentially a small derrick mounted in the rear portion of a vehicle.

Ignoring aesthetics, and until now the industry appears to have ignored aesthetics, there are two basic problems with designing an internal lift. One problem is the variation among scooters that must be accommodated by the lift. A second problem is the changing interior shape of minivans and other vehicles suitable for carrying a scooter. The problem is particularly acute for minivans and smaller sport utility vehicles because the interior space is largely filled by a scooter, leaving precious little room for the lift.

An interior lift includes a post and a boom. A cable extends down from somewhere along the boom for coupling to the scooter to be lifted. Designing a boom and post to fit all vehicles is a significant challenge, even if "all vehicles" is limited to a particular category, such as minivans. The solution to date has been to have a sliding member and a fixed member for at least the boom. The sliding member includes a plurality of holes by which the length of the boom can be adjusted. Such construction is prone to rattles and compromise fits at best.

The location of the post affects the length of the boom, which is limited by the width of the vehicle and the size of the scooter. The boom must locate the scooter approximately in the center of the vehicle for transport yet be long enough to extend well past the rear bumper for placing the scooter on the ground. Newer minivans are much less square than older vans. The result is that sloping roof line limits the height of the post. Newer minivans also include a large molding along the outer edge of the rear deck, forcing the lift to be located further from the rear bumper. If the post is located farther away from the rear bumper, then the boom must be longer for the scooter to clear the bumper. As indicated before, the boom cannot be arbitrarily long.

A solution of sorts has been to use a short post and a non-horizontal boom, perhaps making the boom from a perforated sliding member and a fixed member; see, for example, U.S. Pat. No. 5,205,700 (Lin et al.) or U.S. Pat. No. 5,853,282 (Bechler et al.). The boom extends diagonally across the rear window of the vehicle and interferes with rearward vision or extends forward into the passenger space of the vehicle. An alternative is the use of a boom extension, which is awkward to use. It is known in the art to pivot the boom about an axis displaced from the axis of the post; see, for example, U.S. Pat. No. 5,810,547 (Bruno et al.) Segmenting a boom in this way increases its length but does not simplify or improve storage. The Bruno et al. patent uses a removable post, which simplifies storage to some extent but also means the apparatus must be set up and taken down each time it is used, which is not very convenient and may be impossible for someone needing a scooter for mobility.

If a beam is made from lightweight materials so as not to interfere with rearward visibility, then the beam must be supported somewhere along its length. The beam cannot simply be cantilever mounted to the post. Such support adds to the mechanical complexity of the lift and detracts from the appearance of the lift.

In view of the foregoing, it is therefore an object of the invention to provide an improved internal scooter lift for a minivan.

Another object of the invention is to provide a lift having a cantilever mounted boom.

A further object of the invention is to provide a lift having a cantilever mounted boom that is easily and precisely adjusted in elevation.

Another object of the invention is to provide a lift that conforms to the shape of the rear of a minivan.

A further object of the invention is to provide a lift that has a substantially horizontal boom attached to a post located within the sloping rear section of a vehicle near the rear bumper.

Another object of the invention is to provide a lift that minimally obstructs rearward visibility in a minivan.

A further object of the invention is to provide a lift that does not require a boom extension to clear the rear bumper of a vehicle.

SUMMARY OF THE INVENTION

The foregoing objects are achieved in this invention in which a scooter lift includes a post and boom made from a single piece of curved pipe. The boom further includes an arm that is rotationally adjustable about the pipe to provide small, incremental changes in elevation. Incremental rotational adjustment is achieved by a plate attached to the pipe and having a first set of holes that align with second set holes in the angular portion. The holes are drilled in a pattern that provides a vernier-like adjustment of position. The post is mounted on a base such that at least some of the post overlies a point outside the footprint of the base.

BRIEF DESCRIPTION OF THE DRAWINGS

A more complete understanding of the invention can be obtained by considering the following detailed description in conjunction with the accompanying drawings, in which:

FIG. 2 is a perspective view of the lift from a different angle, showing support brackets and other details;

DETAILED DESCRIPTION OF THE INVENTION

Figure 1:
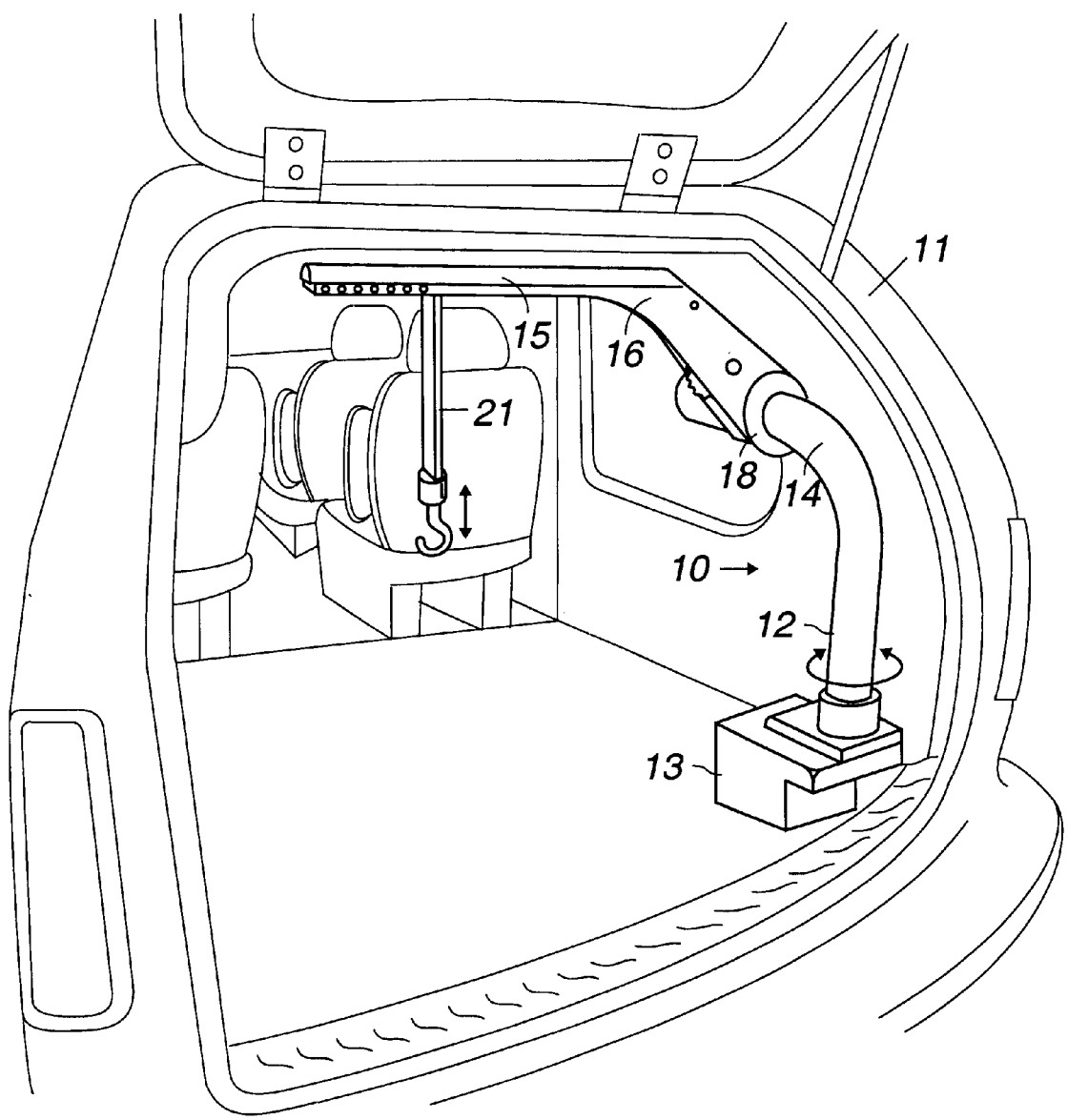
FIG. 1 is a perspective view of a lift constructed in accordance with a preferred embodiment of the invention and located in a minivan.

Reference is made to both FIG. 1 and FIG. 2. FIG. 1 is shows lift 10 in the right rear quarter of minivan 11. FIG. 2 is also a perspective view but more of a side view of lift 10. Base 13 includes a thrust bearing, a motor, and a reduction mechanism (not shown) for rotating post 12 about a first, generally vertical, axis. Preferably a belt or direct drive is used, enabling the post to be rotated by hand when the power is off and the motor is not shorted. A worm gear would not drive the motor and is not preferred. Base 13 is attached to minivan 11 by support members 18 and 19 (FIG. 2).

In accordance with one aspect of the invention, post 12 is cantilever mounted to base 13 such that the post is offset toward the bumper of minivan 11 to provide clearance for molding or other fittings in the minivan. Referring to FIG. 2, base 13 include extended portion 22 that provides a cantilever or overhanging support for post 12. When base 13 is mounted in a minivan, the base has a footprint in contact with the floor of the minivan and post 12 overlies a portion of the minivan substantially outside the footprint and closer to the rear bumper. Post 12 has a diameter of three to four inches and the offset aids considerably in fitting the lift to a minivan. The clearance (that is, the distance from the bottom of offset portion 22 to the bottom of base 13) is on the order of one to three inches, which is more than adequate and does not increase the height of the base.

In accordance with another aspect of the invention, the post and boom include a single piece of curved pipe, preferably of circular cross-section and bent 90°. A circular cross-section is preferred. Any cross-sectional shape could be used. The curved pipe provides at least two benefits, in addition to a pleasing appearance. The pipe conforms to the sloping shape of the minivan and positions arm 15 inward from post 12. This positioning makes it much easier to locate a scooter (not shown) within the rear of minivan 11. Similarly, the horizontal portion of the pipe helps move the free end of arm 15 further outward from minivan 11 while unloading a scooter.

Arm 15 has an inverted-U cross-section and houses belt 21 (FIG. 1) and spool 23 (FIG. 2) for lifting a scooter. Spool 23 and a mechanism for driving the spool, preferably a worm gear mechanism, are located within angled portion 16 of the arm. Motor 25, for driving the spool, is located outside angled portion 16. The free end of belt 21 extends downward from arm 15 for attachment to a scooter. The point at which belt 21 descends from arm 15 is adjustable along the length of the arm. As can be seen from FIG. 1, angled portion 16 somewhat matches the sloping interior of minivan 11. Arm 15 is located near the ceiling of the minivan. The combination of curved pipe, angled portion of the arm and horizontal portion of the arm provides minimal obstruction of rearward vision. Angled portion 16 also provides a broad web for attaching arm 15 to boom 14. The point of attachment is offset from the vertical axis about with post 12 rotates. This increases the versatility of the lift mechanism and enables the arm to reach farther outward over the bumper of the minivan.

Arm 15 rotates about a substantially horizontal axis in a vertical plane for fitting lift 10 to a vehicle. Once adjusted, there is no rotation about the horizontal axis except for slight flexing as a scooter is lifted. A lift constructed as shown lifted 350 pounds, well in excess of the weight of the typical scooter, while the end of arm 15 deflected less than 0.5 inch. Any limitation on weight does not come from the invention. Greater weight could be lifted if a stronger belt and larger motor had been used.

Figure 3:
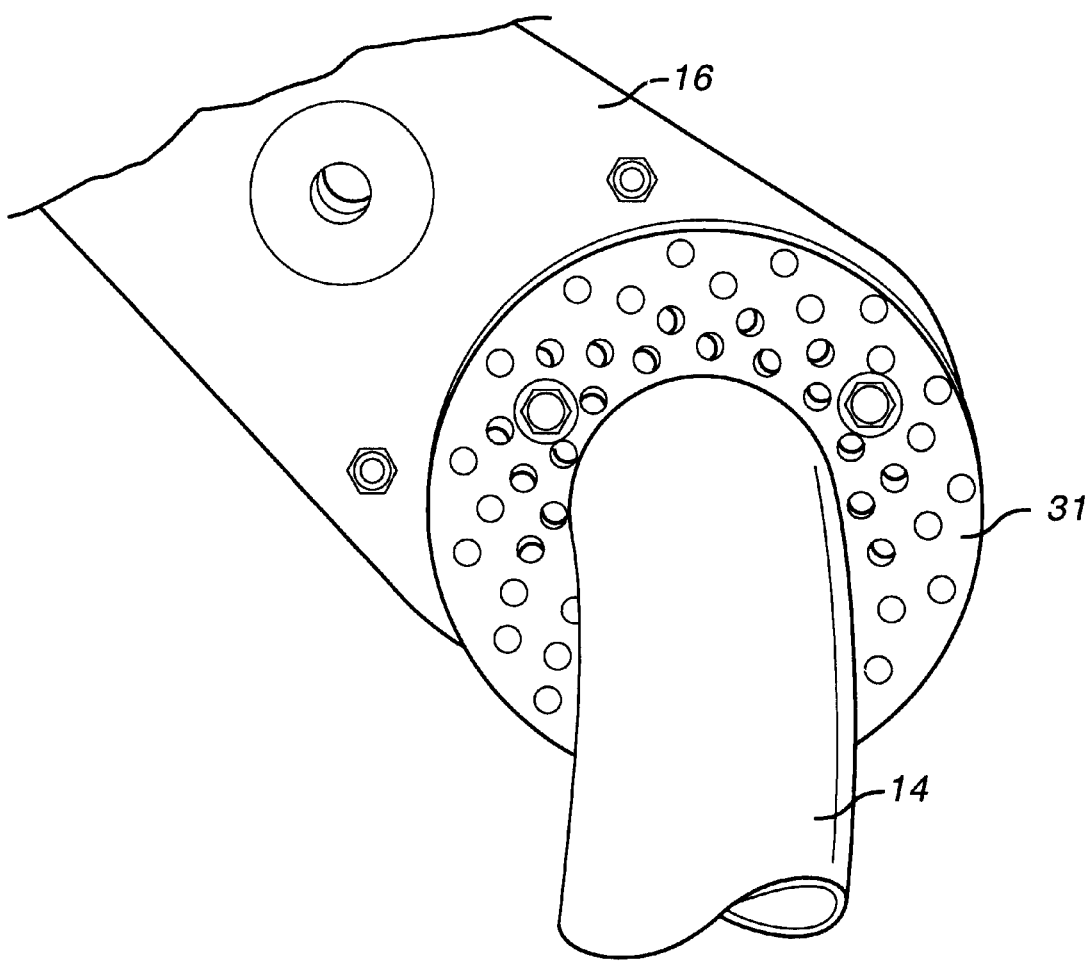
FIG. 3 is a detailed view of the attachment of the arm to the boom portion of a curved pipe.

In FIG. 3, angled portion 16 preferably surrounds boom 14 and includes a plurality of holes arranged in concentric rings. Plate 31, welded to boom 14, also includes a plurality of holes in concentric rings. As angled portion 16 is rotated about boom 14, different sets of holes become aligned. In one embodiment of the invention, each set included three holes. A bolt passes through each pair of aligned holes and secures the position of the arm. In accordance with another aspect of the invention, the holes in angled portion 16 are separated by a different amount from the spacing of the holes in plate 31. By locating the holes in this fashion, angled portion 16 can be adjusted in 2° increments even though the holes are located along radials at much greater intervals.

Figure 4:
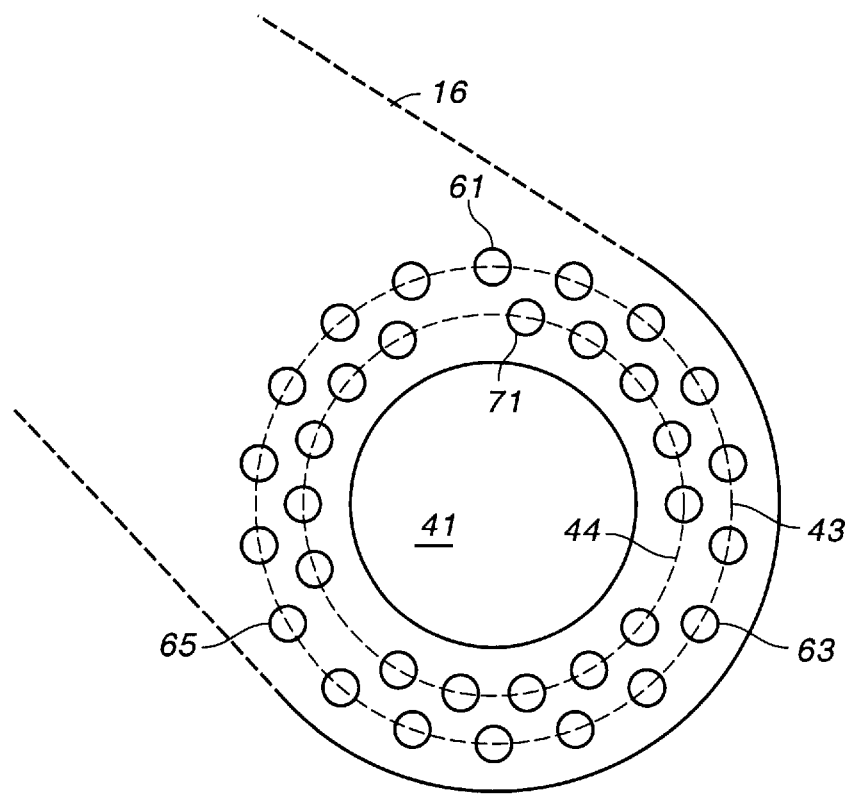
FIG. 4 is a plan view of the inner end of the arm having a first hole pattern.

FIG. 4 illustrates a preferred embodiment of the location of the holes for angled portion 16, wherein the holes are located at 20° intervals. Angled portion 16 terminates in an annular section having an inside diameter and an outside diameter. The inside diameter rotates about the curved pipe (not shown in FIG. 4). Superimposed on angled portion 16 are two concentric circles, 43 and 44. The circles are evenly spaced between the inner diameter and the outer diameter but this is not a requirement. Holes are located at the intersections of the circles and radii (not shown) at 20° intervals. Some holes are omitted as unnecessary and the resultant hole pattern repeats three times or every 120°.

Figure 5:
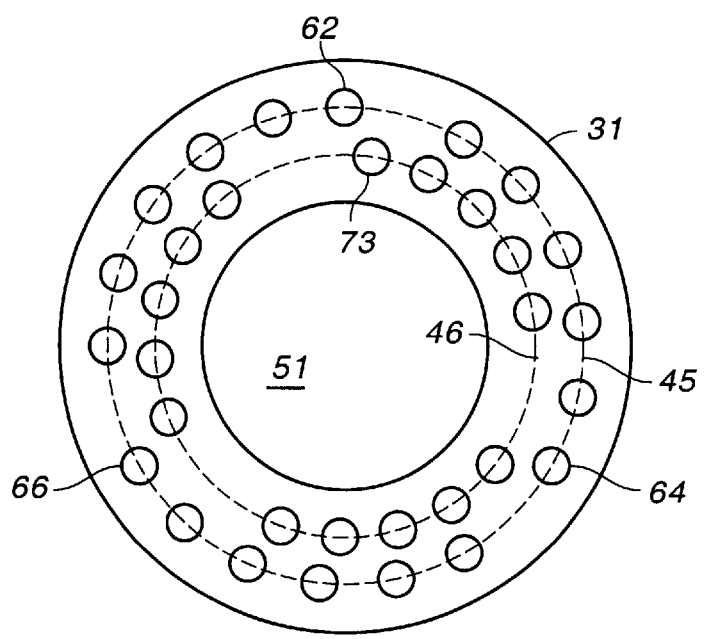
FIG. 5 is a plan view of the mounting plate having a second hole pattern.

FIG. 5 illustrates a preferred embodiment of the location of the holes for plate 31, wherein the holes are located at 18° intervals. Plate 31 is an annulus having an inside diameter and an outside diameter. The inside diameter is welded to the curved pipe. Superimposed on plate 31 are two concentric circles, 45 and 46. The circles are evenly spaced between the inner diameter and the outer diameter but this is not a requirement. Holes are located at the intersections of the circles and radii (not shown) at 18° intervals. Some holes are omitted as unnecessary and the resultant hole pattern repeats three times or every 120°, as in FIG. 4.

Positioned as shown in FIGS. 4 and 5, hole 61 is aligned with hole 62, hole 63 is aligned with hole 64, and hole 65 is aligned with hole 66. Angled portion 16 extends to the left at approximately 50° from vertical. Rotating angled portion 16 clockwise just 2° brings hole 71 into alignment with hole 73 (and two other pairs of holes into alignment). Further rotation brings successive sets of holes into alignment at 2° intervals. Thus, a relatively simple but extremely sturdy mechanism enables a small incremental adjustment to be made in the position of the arm.

The invention thus provides an improved internal scooter lift for a minivan that conforms to the shape of the rear of a minivan and is aesthetically pleasing. The lift includes a cantilever mounted, horizontal boom that is easily and precisely adjusted in elevation and minimally obstructs rearward visibility in a minivan. The offset in the base enables the post to be located closer the rear bumper than in lifts of the prior art, thereby shortening the length of the arm.

Having thus described the invention, it will be apparent to those of skill in the art that various modifications can be made within the scope of the invention. For example, the type of coupling for attaching a scooter to the belt does not affect the invention. Similarly, whether a belt or a cable is used is a matter of design. While described in the context of a scooter lift, obviously the lift could be used for loading or unloading any large object; e.g. a powered wheelchair or even an animal in a cage. Similarly, while described in conjunction with a minivan, where space is most likely to be at a premium, the invention can be used in any vehicle, e.g. from a station wagon to a step van. Although not specifically described, a plurality of sensors and limit switches are used in this scooter lift, as in others, for limiting motion and protecting a user. The pipe and arm are preferably made from steel but other materials could be used instead. Instead of aligning perforated plates, one could weld a cylinder to the end of the angular portion and have holes in the cylinder align with holes in the pipe.

What is claimed as the invention is:

1. In a lift for a scooter, said lift mounted within a passenger vehicle near an opening for a door or hatch, wherein the lift includes a post attached to a base and a boom attached to the post, and wherein the post rotates about a substantially vertical axis, the improvement comprising:

an arm mounted on said boom and rotatable in a plane approximately perpendicular to said boom.

2. The lift as set forth in claim 1 wherein said boom and said post are made from a single pipe having a curved portion joining said post and said boom.

3. The lift as set forth in claim 1 wherein said plane is displaced from and substantially parallel to said post.

4. The lift as set forth in claim 1 wherein said arm has a horizontal portion and an angled portion, wherein the angled portion is rotatably mounted on said boom.

5. The lift as set forth in claim 4 and further including a plate attached to said boom, wherein said plate includes a first plurality of holes and wherein the angled portion of said arm includes a second plurality of holes, whereby the alignment of at least one hole in said plate with at least one hole in said angled portion provides rotational adjustment for said arm.

6. The lift as set forth in claim 5 wherein each plurality of holes includes two concentric rings of holes.

7. The lift as set forth in claim 5 wherein the first plurality of holes are angularly displaced a first amount and the second plurality of holes is angularly displaced a second amount, wherein the first amount does not equal the second amount.

8. A passenger vehicle having at least one opening for a door or a hatch and having a rear quarter that curves inwardly in at least one direction, said vehicle comprising:

a floor in said rear quarter;

a lift attached to said floor near said opening, wherein said lift includes a post and boom made from a single piece of curved pipe, wherein said pipe curves approximately 90°, forming a vertical portion and a horizontal portion, and an arm mounted on said horizontal portion and rotatable in a substantially vertical plane about said horizontal portion;

whereby said lift fits within said rear quarter when said post is in a first position and said boom and said arm extend from said vehicle when said post is rotated to a second position.

9. The vehicle as set forth in claim 8 wherein said arm has a horizontal portion and an angled portion, wherein the angled portion is rotatably mounted on said boom portion, whereby said lift fits within the inwardly curved portion of said rear quarter.

10. In a lift for a scooter, said lift having a post attached to a passenger vehicle and a boom attached to the post, wherein the post rotates about a substantially vertical axis, the improvement comprising:

the post and at least a portion of the boom are made from a single piece of curved pipe;

an arm having an annular section fitting about said pipe, allowing the arm to rotate about the pipe in a plane approximately perpendicular to said pipe;

a plate attached to the boom portion of said pipe, wherein said plate includes a first plurality of holes and wherein said annular section includes a second plurality of holes, whereby the alignment of respective pairs of holes provides adjustment for said arm.

11. The lift as set forth in claim 10 wherein the first plurality of holes are angularly separated by a first amount and the second plurality of holes are angularly separated by a second amount.

12. The lift as set forth in claim 11 wherein the first amount is 18° and the second amount is 20°.

13. In a scooter lift having a post coupled to a base for attachment to a passenger vehicle and a boom attached to the post, wherein the post rotates about a substantially vertical axis, the improvement comprising:

the post and at least a portion of the boom are made from a single piece of pipe having a curved portion joining the boom portion and the post portion;

an arm attached to the boom portion of the pipe at a location displaced from said vertical axis;

wherein said pipe is curved approximately 90° and said arm rotates in a plane that is substantially parallel with said vertical axis.

14. In a scooter lift for a passenger vehicle wherein the lift includes a base adapted to be attached to the vehicle, a post coupled to the base and rotatable about a substantially vertical axis, and a boom attached to the post, the improvement comprising:

the base includes a cantilever portion for supporting the post offset from the footprint of the base to clear moldings or other fittings in the rear of the vehicle.

15. The lift as set forth in claim 14 wherein the post and at least a portion of the boom are made from a single piece of curved pipe.

16. The lift as set forth in claim 15 wherein the pipe curves 90°, forming a post portion and a boom portion.

17. The lift as set forth in claim 16 and further including an arm rotatably mounted on said boom portion.

18. The lift as set forth in claim 17 and further including a plate attached to said boom portion, wherein said plate includes a first plurality of holes and wherein said arm includes a second plurality of holes, whereby the alignment of a set of holes provides adjustment for said arm.

19. The lift as set forth in claim 18 wherein each plurality of holes includes two concentric rings of holes.

20. The lift as set forth in claim 18 wherein the first plurality of holes are angularly displaced a first amount and the second plurality of holes is angularly displaced a second amount, wherein the first amount does not equal the second amount.

* * * * *